US008165317B2

(12) United States Patent
Ichikawa et al.

(10) Patent No.: US 8,165,317 B2
(45) Date of Patent: Apr. 24, 2012

(54) METHOD AND SYSTEM FOR POSITION DETECTION OF A SOUND SOURCE

(75) Inventors: Osamu Ichikawa, Kanagawa-ken (JP); Tohru Nagano, Kanagawa-ken (JP); Masafumi Nishimura, Kanagawa-ken (JP)

(73) Assignee: International Business Machines Corporation, Armonk, NY (US)

(*) Notice: Subject to any disclaimer, the term of this patent is extended or adjusted under 35 U.S.C. 154(b) by 350 days.

(21) Appl. No.: 12/498,012

(22) Filed: Jul. 6, 2009

(65) Prior Publication Data

US 2010/0008516 A1   Jan. 14, 2010

(30) Foreign Application Priority Data

Jul. 11, 2008  (JP) ................................ 2008-181514

(51) Int. Cl.
*H04R 3/00* (2006.01)
(52) U.S. Cl. .............................. 381/92; 381/96; 367/118
(58) Field of Classification Search .................. 381/92, 381/95, 97, 98, 94.1, 94.3, 122, 96; 704/231; 367/87, 99, 100, 118, 124, 125
See application file for complete search history.

(56) References Cited

U.S. PATENT DOCUMENTS

2003/0177006 A1* 9/2003 Ichikawa et al. .............. 704/231

FOREIGN PATENT DOCUMENTS

| JP | 2000134688 A2 | 5/2000 |
| JP | 2003156552 A2 | 5/2003 |
| JP | 2005181088 A2 | 7/2005 |
| JP | 2007110357 A2 | 4/2007 |

OTHER PUBLICATIONS

Nishiura et al., Localization of Multiple Sound Sources Based on a CSP Analysis wiht a Microphone Array, Proceedings of the Acoustics, Speech and Signal Processing 2000 IEEE International Conference, vol. 02, 2000. pp. 1053-1056.*
T. Nishiura, et al, "Localization of multiple sound sources based on a CSP analysis with a microphone array," Proc. ICASSP2000, 2000 IEEE Int. Conf., vol. 2, 2000.
"Wii Remote," http://ja.wikipedia.org, Jun. 30, 2008.

* cited by examiner

*Primary Examiner* — Vivian Chin
*Assistant Examiner* — Friedrich W Fahnert
(74) *Attorney, Agent, or Firm* — Vazken Alexanian

(57) ABSTRACT

A position detection method, system, and computer readable article of manufacture tangibly embodying computer readable instructions for executing the method for detecting the position of a sound source using at least two microphones. The method includes the steps of: emitting a reproduced sound from the sound source; observing the reproduced sound and an observed sound at the microphones; converting the reproduced sound and the observed sound into electrical signals; transforming the signals of the reproduced sound and of the observed sound into frequency spectra by a frequency spectrum transformer apparatus; calculating Crosspower Spectrum Phase (CSP) coefficients of the frequency spectra of the signals by a CSP coefficient calculator apparatus; and calculating distances between the position of the sound source and the positions of the microphones based on the calculated CSP coefficients by a distance calculating apparatus, thereby detecting the position of the sound source.

12 Claims, 15 Drawing Sheets

US 8,165,317 B2

METHOD AND SYSTEM FOR POSITION DETECTION OF A SOUND SOURCE

CROSS-REFERENCE TO RELATED APPLICATION

This application claims priority under 35 U.S.C. §119 from Japanese Patent Application No. 2008-181514 filed on Jul. 11, 2008, the entire contents of which are incorporated herein by reference.

BACKGROUND OF THE INVENTION

1. Field of the Invention

The present invention relates to a method and system for detecting the position of a sound source using an audio signal. More particularly, it relates to a method and system for detecting position information of a user of a personal computer simulation or game machine.

2. Description of Related Art

Conventionally, personal-use simulation or game machines capable of operating a simulation or game by means of a user swinging an attached remote controller in a hand or turning it to a screen have emerged and become popular, Non-Patent Document 1. For example, a motion sensor, infra-red light CMOS sensor, built in the remote controller, referred to as a remote control, detects acceleration. A pointer in the remote control receives light from light-emitting means, a sensor bar, installed near a video display screen, enabling detection of the direction and distance of the remote control to the video display.

Also, a microphone array technique using an audio signal for position detection is conventionally known, Patent Document 1. For example, the direction of a target sound source can be estimated by calculating a Crosspower Spectrum Phase (CSP) coefficient between sounds observed by two microphones, Non-Patent Document 2. Further, there are known techniques: a technique using a test pattern for a sound source, Patent Document 2; a technique using a different frequency band for each sound source, Patent Document 3; a technique for performing two-dimensional or three-dimensional position estimation using multiple microphone arrays, Patent Document 4.

Patent references include documents: Patent Document 1, Japanese Patent Application Laid-Open No. 2000-134688; Patent Document 2, Japanese Patent Application Laid-Open No. 2007-110357; Patent Document 3, Japanese Patent Application Laid-Open No. 2005-181088; and Patent Document 4, Japanese Patent Application Laid-Open No. 2003-156552.

Non-patent references include: Non-Patent Document 1, "Wii Remote," http://ja.wikipedia.org, Jun. 30, 2008; and Non-Patent Document 2, T. Nishiura, T. Yamada, S. Nakamura, K. Shikano, "Localization of multiple sound sources based on a CSP analysis with a microphone array," Proceedings of the Acoustics, Speech, and Signal Processing, 2000 IEEE International Conference, Volume 02, 2000.

SUMMARY OF THE INVENTION

According to an aspect of the present invention, there is provided a position detection method for detecting the position of a sound source using at least two microphones. The method includes the steps of: emitting a reproduced sound from the sound source; observing the reproduced sound and an observed sound at the microphones; converting the reproduced sound and the observed sound into electrical signals by the microphones; transforming the signals of the reproduced sound and of the observed sound into frequency spectra by a frequency spectrum transformer apparatus; calculating Crosspower Spectrum Phase (CSP) coefficients of the frequency spectra of the signals by a CSP coefficient calculator apparatus; and calculating distances between the position of the sound source and the positions of the microphones based on the calculated CSP coefficients by a distance calculating apparatus, thereby detecting the position of the sound source.

According to another aspect of the present invention, there is provided a computer readable article of manufacture tangibly embodying computer readable instructions which when implemented cause the computer to execute the steps of the above method for detecting the position of a sound source.

According to yet another aspect of the present invention, there is provided a position detection system for detecting the position of a sound source using at least two microphones. The system includes: a sound source apparatus for emitting a reproduced sound; the at least two microphones for observing the reproduced and an observed sound at the microphones and for converting the reproduced sound and the observed sound into electrical signals; a frequency spectrum transformer apparatus for transforming the signals of the sounds into frequency spectra; a CSP coefficient calculator apparatus for calculating CSP coefficients of the frequency spectra of the signals of the sounds; and a distance calculator apparatus for calculating distances between the position of the sound source and the positions of the microphones based on the calculated CSP coefficients, thereby detecting the position of the sound source.

Finally, there is provided a position detection computing device for calculating the position of a sound source using at least two microphones. The device includes: a reproduced sound generating apparatus section for generating a reproduced sound emitted by the sound source; an observation apparatus section for observing the reproduced sound from the sound source and an observed sound at each of the microphones; a frequency spectrum transforming apparatus section for transforming signals of the sounds into frequency spectra; a CSP coefficient calculating apparatus section for calculating CSP coefficients of the transformed frequency spectra of the signals; and a distance calculating apparatus section for calculating distances between the position of the sound source and the positions of the microphones based on the calculated CSP coefficients, thereby calculating the position of the sound source.

DETAILED DESCRIPTION OF THE PREFERRED EMBODIMENTS

Figure 1:
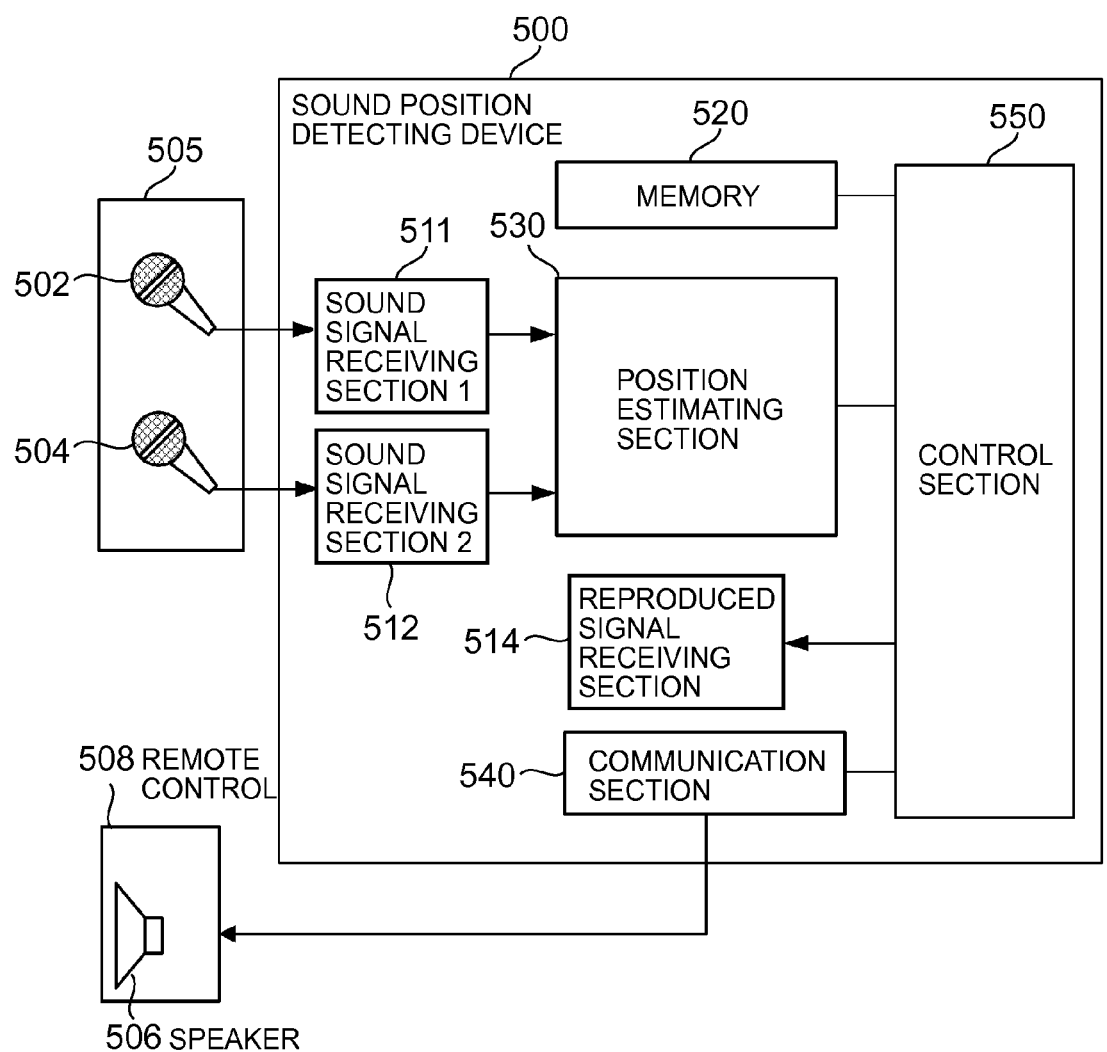
FIG. 1 is a block diagram showing the structure of a sound position detecting device 500 according to one embodiment of the present invention.

Embodiments of the present invention will now be described with reference to the accompanying drawings. Note that these embodiments are just illustrative examples, and the technical scope of the present invention is not limited to these examples.

Sensors used for conventional video simulation or game machines are not able to detect the absolute position of a remote control, i.e., front-to-back distance in addition to the right-to-left direction. For example, in the case of bowling, the standing position of a user and the direction of swinging arm cannot be detected. Therefore, a sensor capable of detecting the absolute position is expected for video simulation or game machines, but since conventional sensors, such as those using image, ultrasonic, and magnetic processing, are all expensive, it is difficult to provide such a sensor in the framework of inexpensive simulation or game machines.

In a position detection method using a microphone array, since estimation accuracy deteriorates in a situation where a strong noise sources exists, it is also difficult to distinguish between a target sound source and the noise source. Further, when the number of microphones is two, it is difficult to acquire the front-to-back distance even if the direction of the position of the target sound source can be acquired.

It is an object of the present invention to acquire front-to-back distance in addition to acquiring the direction of the position of a target sound source of a user using the remote control of a home personal computer simulation or game machine. The object of the present invention includes detecting the absolute position of a user who operates the remote control. The object of the present invention also includes detecting the position of a target sound source even in an environment where strong noise is mixed in, by calculating correlations between a reproduced sound and observed sounds and detecting the position of the remote control using the correlations.

The present invention has been devised in view of the above object to provide solutions to be described below. Note that the terms "audio" and "sound" used in the present specification typically denote vibration of air including sound reproduced by a speaker apparatus. The terms "signal," "audio signal," or "observed signal" typically denote a signal obtained by converting a sound to an electric signal using a microphone, for example, any electric signal generated by a digital signal generator, or a coded electric signal capable of being processed on a computer.

In an embodiment of the present invention, a given reproduced sound such as a known sound effect is reproduced using a speaker apparatus mounted in a remote control apparatus. This reproduced sound is observed by two microphones appropriately provided near a video display or television screen, and an absolute position in front-to-back and right-to-left directions relative to the speaker apparatus mounted in the remote control apparatus is acquired using the observed, reproduced sounds.

In an embodiment of the present invention, using a known signal of reproduced sound from a speaker apparatus, CSP coefficients between the signal of this given, reproduced sound and signals of observed sound observed by the microphones are calculated. Here, two CSP coefficients are calculated for one reproduced sound by observing the reproduced sound independently using two microphones. The peak position of each CSP coefficient corresponds to the distance from each microphone to the speaker apparatus. Since the two CSP coefficients are obtained, a triangulation using the remote control and the two microphones as three apexes is carried out to enable detection of the absolute position of the remote control. Further, in an embodiment of the present invention, detection of a noise source can be enhanced by using the correlations between the signal of a given reproduced sound and the signals of observed sound.

A computer console for a personal simulation or game machine can be used to perform position detection according to an embodiment of the present invention. Any type of computer apparatus can be used as long as it can perform the various steps of the position detection of a sound source, such as reproduction of a given recorded sound, observation of the reproduced sound, and calculation of CSP coefficients for the signals of observed sound.

The present invention can be combined with existing technologies, software technology for personal computer simulation or game machines operating based on body motion of a user, microphone array technology for position detection, audio signal generation technology for position detection, for example. The combined technologies are also included in the technical scope of the present invention.

Similarly, included in the technical scope of the present invention and including the method of the present invention are: a sound-source position detecting system, a sound position detecting system using a reflected sound from a specific object, and a sound position detecting system used for detecting the positions of multiple objects.

Further, the method of the present invention can be implemented as a program product, i.e., in the form of a program capable of allowing an FPGA, Field Programmable Gate Array, an ASIC, Application Specific Integrated Circuit, a hardware logic device equivalent to FPGA and ASIC technology, a programmable integrated circuit, or a combination of those technologies, to store various steps for position detection of a sound source. Specifically, a sound-source position detecting device according to an embodiment of the present invention can be provided in the form of a custom LSI, Large-Scale Integration circuit provided with a data input/output, a data bus, a memory bus, and a system bus. A program product stored in such integrated circuit devices is also included in the technical scope of the present invention.

According to an embodiment of the present invention, distance in the front-to-back direction of a target sound source as well as its position in the right-to-left direction in a remote control for a personal computer simulation or game machine can be acquired. Thus, in an embodiment of the present invention, it is possible to detect the absolute position of a user who operates a remote control. Further, the embodiment of the present invention is capable of detecting the position of a target sound source even in an environment where strong noise is present, by calculating correlations between a signal of a recorded or reproduced sound and signals of observed sound and by detecting the position of the remote control using the correlations.

Block Diagram of a Sound Position Detecting Device

FIG. 1 shows the structure of a sound position detecting device 500 according to an embodiment of the present invention. The sound position detecting device 500 includes a sound signal receiving apparatus section 1, 511, a sound signal receiving apparatus section 2, 512, a reproduced signal receiving apparatus section 514, a memory 520, a position estimating or calculating apparatus section 530, a communication apparatus section 540, and a control apparatus section 550.

The sound position detecting device 500 is connected to a microphone array 505 and a remote control apparatus 508. The microphone array 505 is equipped with a microphone 1, 502, and a microphone 2, 504, and the remote control 508 is equipped with a speaker apparatus 506. The microphone array 505 is connected preferably by wire to the sound position detecting device 500, but the connection is not so limited and it may be connected by a wireless connection. The signal of the reproduced sound from the speaker apparatus of the remote control 508 as a sound source apparatus observed by the microphone array 505 is typically sent to the sound position detecting device 500 in the form of electric signals.

The remote control 508 is connected through a communication apparatus section 540 to the sound position detecting device 500 in such a manner so as to be bi-directionally communicable. Preferably, the communication between the remote control 508 and the communication apparatus section 540 is made by wireless connection. For example, a detected signal of an acceleration sensor, not shown, built into the remote control 508 is sent from the remote control 508 to the sound position detecting device, and a reproduced sound, such as a sound effect reproduced from the speaker apparatus 506, and information on reproduction timing are sent from the sound position detecting device 500 to the remote control 508.

In the operation of the sound position detecting device 500 according to an embodiment of the present invention, a signal of a given reproduced sound, such as a known sound effect, is selected using the control apparatus section 550. The selected signal of the reproduced sound such as the sound effect is sent to the reproduced signal receiving apparatus section 514 and the communication apparatus section 540. The signal of the reproduced sound sent to the reproduced signal receiving apparatus section 514 is further sent to the position estimating apparatus section 530, and used for correlation calculations.

The signal of the reproduced sound sent to the communication apparatus section 540 is further sent to the remote control 508, and reproduced from the speaker apparatus 506 inside the remote control 508. The reproduced sound effect is observed by the microphone 1, 502 and the microphone 2, 504 as signals from the sound source. The observed signals from the sound source are converted to digital codes which can be processed by a computer for respective microphones by means of the sound signal receiving apparatus section 1 and the sound signal receiving apparatus section 2. The data are then sent to the position estimating apparatus section 530. The position estimating apparatus section 530 calculates correlations between the signals from the sound source observed at the respective microphones and the signal of the reproduced sound such as the sound effect received through the above-mentioned reproduced signal receiving apparatus section 514 to calculate CSP coefficients. In various steps of the operation of the position estimating apparatus section 530, the memory 520 is appropriately used for calculations.

In this embodiment, the microphone array 505 is constructed to incorporate the microphone 1, 502, and microphone 2, 504, in a common housing. The conversion of an audio signal, which is obtained by converting a sound to an electric signal, into digital codes which can be processed by a computer using an A/D converter is known in the art. The microphone array 505 may send the respective signals observed by the microphone 1, 502, and the microphone 2, 504, to a simulation or game machine body as analog audio signals, or an A/D converter, not shown, may be equipped in the microphone array 505 so that the microphone array 505 will send digitally coded audio signals to the sound position detecting device 500. In another embodiment, the microphone array 505 may be built in an accessory component capable of detecting the direction of the remote control, such as a sensor bar preferably equipped in the personal computer simulation or game machine.

In this embodiment, the sound position detecting device 500 according to an embodiment of the present invention is configured to use a personal video simulation or game machine, appropriately adding the microphone array 505, the sound signal receiving apparatus section 1, 502, and the sound signal receiving apparatus section 2, 504. The respective functions of the control apparatus section 550 and the position estimating apparatus section 530 may be implemented by using available hardware. For example, the sound effect may be a sound effect corresponding to that produced by a swinging arm upon throwing a ball in a bowling simulation or game. The sound effect is not limited in this way. It may consist of general background music, abbreviated as BGM, for example.

Since the sound position detecting device 500 operates in this way, a device for position detection of a sound source can be constructed without making significant changes in the structure or appearance of the device, e.g., a personal computer simulation or game machine.

Flowchart of a Sound-Source Position Detecting Method

Figure 2:
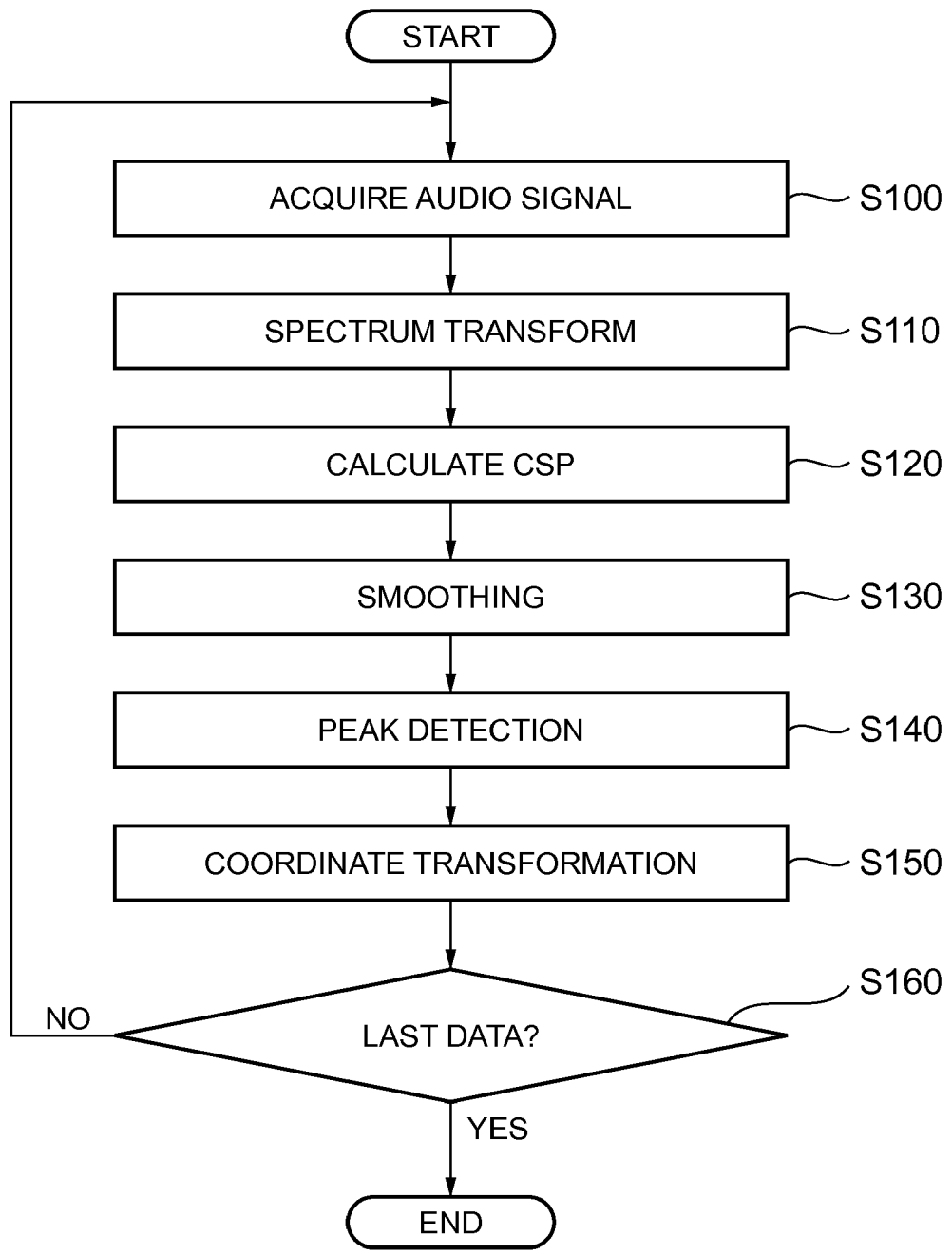
FIG. 2 is a flowchart of a sound-source position detecting method according to an embodiment of the present invention.

FIG. 2 shows a flowchart of a sound-source position detecting method according to one embodiment of the present invention. The details of calculation formulas used in various steps will be described below.

First, in an audio signal acquiring step, S100, the sound-source position detecting method according to an embodiment of the present invention acquires for subsequent various steps, signals of observed sound and a signal of reproduced sound such as a known audio signal. In this embodiment, the signals of observed sound may be two independent audio signals obtained in such a manner that the known audio signal is reproduced as a sound appropriately using a speaker apparatus, observed using two microphones simultaneously, and converted to electric signals. Typically, in step S100, a total of three audio signals, i.e., two signals of observed sound and one signal of reproduced sound, are acquired.

The acquired audio signals may be converted to digital codes which can be processed by a computer. In this embodiment, the digital codes are time-domain data sampled at a sampling frequency of 22 kHz and have a word length of 16 bits. Preferably, the acquired audio signals are handled as a collection of data in units of frames with one frame set to 10 msec. The signal of a reproduced sound, such as a known audio signal, may be delayed appropriately so that it will be included in the same frame as the signals of observed sound.

Next, in a spectral transform step, S110, the sound-source position detecting method according to an embodiment of the present invention performs a discrete Fourier transform on each of the signals of observed sound and the signal of reproduced sound such as a known audio signal in units of frames to obtain complex spectra. In the embodiment, a total of three signals, i.e., two signals of observed sound and one signal of reproduced sound, are transformed into complex spectra, respectively.

Next, in a CSP calculation step, S120, the sound-source position detecting method according to an embodiment of the present invention calculates CSP coefficients using the complex spectra of the signals of observed sound and the complex spectrum of the signal of reproduced sound such as a known audio signal. In the embodiment, the CSP coefficients are calculated commonly using the complex spectrum of the signal of reproduced sound for the complex spectra of the two signals of observed sound, respectively. In other words, two CSP coefficients are obtained. Specifically, among the CSP coefficients calculated for the two signals of observed sound using two microphones, one includes information of the signal of observed sound concerning one microphone and the other includes information of the signal of observed sound concerning the other microphone.

Next, in a smoothing step, S130, the sound-source position detecting method according to an embodiment of the present invention determines the time-direction of each of the CSP coefficients obtained, i.e., a weighted average across plural frames. In the embodiment, the plural frames are ten frames.

Next, in a peak detection step, S140, the sound-source position detecting method according to an embodiment of the present invention keeps track of maximum values of the respective CSP coefficients after subjected to smoothing to acquire peak position information. Thus, the peak position information using time as a variable is obtained for each of the two signals of observed sound observed by the two microphones. A technique well-known in the art can be used to keep track of maximum values. Preferably, the maximum values are tracked by dynamic programming, abbreviated as DP.

Next, in a coordinate transformation step, S150, the sound-source position detecting method according to an embodiment of the present invention transforms the above maximum value information using time as the variable into distance information using time as the variable. Thus, distances from one speaker apparatus used for reproduction of the signal such as the known sound effect to the two microphones are obtained using time as the variable. If the distance between the two microphones is known, the absolute position of the one speaker apparatus, i.e., the coordinates of the one speaker apparatus in a coordinate system on a plane including the two microphones and the one speaker apparatus can be known by a triangulation.

Next, in the step, S160, of determining whether the data is the last data, the sound-source position detecting method according to an embodiment of the present invention detects information for ending the position detection. If the determination indicates a logical value of false, on no, the procedure returns to step S100, while if it is true or yes, the operation of the various steps of the position detection are ended. The information for ending the position detection can be designed appropriately, such as to make the strength of each of the signals of observed sound smaller than a predetermined value, to use a predetermined audio signal in order to allow a simulation or game program to end the position detection, or to write the information for ending the position detection to a specific memory area of a computer apparatus for a simulation or game machine in order to allow the simulation or game program to end the position detection.

In the sound-source position detecting method according to an embodiment of the present invention using these various steps, the calculations of the CSP coefficients based on the known audio signal makes it possible to detect two-dimensional position information of the remote control equipped with the speaker apparatus. Since the distances to be calculated are determined by a triangulation using the distances between two microphones and one speaker apparatus, absolute position information including front-to-back and right-to-left distances of the sound source can be detected by the sound-source position detecting method according to an embodiment of the present invention.

Structure of the Position Estimating Apparatus Section 530

Figure 3:
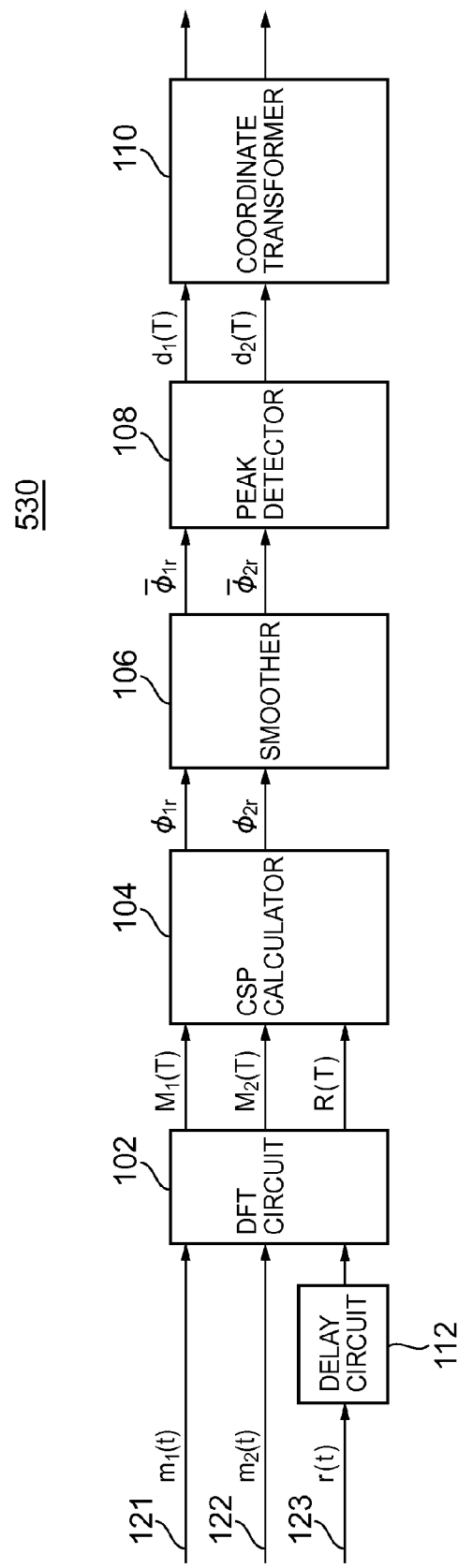
FIG. 3 is a diagram showing the structure of a position estimating apparatus section 530 of the sound position detecting device 500 according to an embodiment of the present invention.

FIG. 3 shows the structure of the position estimating apparatus section 530 of the sound position detecting device 500 according to an embodiment of the present invention. The position estimating apparatus section 530 receives, as inputs, a signal 1, 121, of observed sound, a signal 2, 122, of observed sound, and a known audio signal 123, including a DFT circuit 102, a CSP calculator 104, a smoother 106, a peak detector 108, a coordinate transformer 110, and a delay circuit 112.

In the operation of the DFT circuit 102, the CSP calculator 104, the smoother 106, and the peak detector 108 included in the position estimating apparatus section 530, it is preferable to divide the audio signal in the time domain into frames and to perform each step on each divided frame of the audio signal. Typically, the audio signal may be divided into frames of 10 to 20 milliseconds.

First, a signal of reproduced sound, such as a known sound effect, is set at r(t). This may be the audio signal sent to the position estimating apparatus section 530 through the reproduced signal receiving apparatus section 514 shown in FIG. 1. Next, signals of observed sound observed by the microphone array 505 are set at $m_1(t)$ and $m_2(t)$. For example, the signal $m_1(t)$ of observed sound is the signal observed by the microphone 1, 502, and the signal $m_2(t)$ of observed sound is the signal observed by the microphone 2, 504. Typically, each of r(t), $m_1(t)$, and $m_2(t)$, may be a coded signal which can be processed by a computer.

Since the signal r(t) of reproduced sound arrives earlier than the signal m1(t) and signal m2(t) of observed sound, it is delayed appropriately using the delay circuit 112 to synchronize it with the signals of observed sound. For example, when subsequent various steps are performed in units of time frames, this synchronization may be so made that the delayed signal of reproduced sound and the signals of observed sound fall within one frame in the subsequent various steps.

If the distance between a speaker apparatus and each of the microphones, i.e., the distance between each player and a TV display screen is approximately determined, a fixed amount of delay may be given, or otherwise, an amount of delay to provide synchronization at the time of starting a simulation or game or the starting of operation by the player. The amount of delay may be so adjusted that the correlation between the signal of observed sound from one microphone and the signal of reproduced sound becomes the maximum. If the amount of delay is τ, the signal of delayed reproduced sound is represented as r(t+τ).

Then, at the DFT circuit 102, the discrete Fourier transform is performed respectively on the output of the delay circuit 112 and the signals $m_1(t)$ and $m_2(t)$ of observed sound in units of frames to transform them to complex spectra. Using T as the frame number, these complex spectra are represented as a spectrum R(T) of reproduced sound, and spectra $M_1(T)$ and $M_2(T)$ of observed sound, respectively.

Next, at the CSP calculator 104, two CSP coefficients are calculated as expressed in the following equations:

$$\phi_{1r}(T) = iDFT\left(\frac{M_1(T)R(T)^*}{|M_1(T)||R(T)|}\right) \quad \text{Equation 1}$$

$$\phi_{2r}(T) = iDFT\left(\frac{M_2(T)R(T)^*}{|M_2(T)||R(T)|}\right), \quad \text{Equation 2}$$

where iDFT is an inverse discrete Fourier transform, * indicates a complex conjugate number, and $\phi_{1r}$, $\phi_{2r}$ are vectors each of which is a correlation value corresponding to the delay time or advance time of the two signals. In the diagram, 106 is a smoother, 108 a peak detector, and 110 a coordinate transformer described below.

Figure 4:
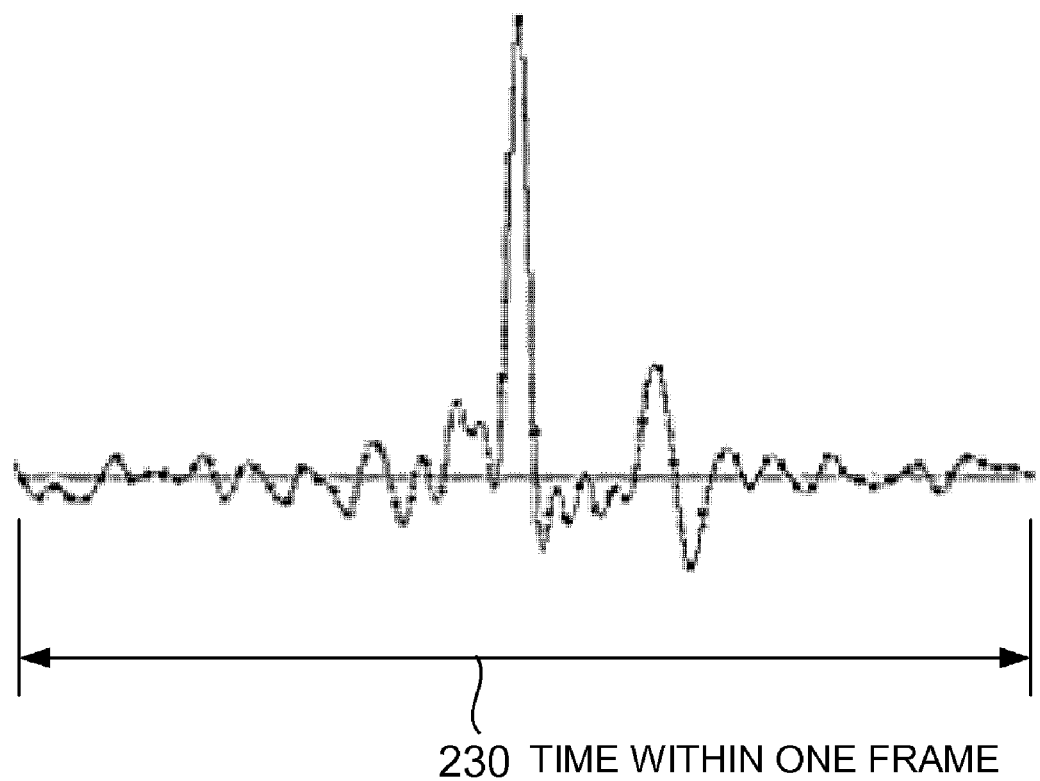
FIG. 4 is a graph showing an example of a CSP coefficient based on a signal of observed sound and a signal of reproduced sound in one frame according to an embodiment of the present invention.

FIG. 4 shows an example of a CSP coefficient based on the signal of observed sound and the signal of reproduced sound in one frame. The horizontal axis is time, 230, in one frame, and the vertical axis is the correlation value. As shown in FIG. 4, the CSP coefficient has a principal peak equivalent to the time difference between the signal of observed sound and the signal of reproduced sound.

In other words, if the speaker apparatus gets near or away from the microphone, the position of this peak moves accordingly. Note that the band may be limited in the calculation of iDFT. In other words, a low frequency region and a high frequency region may be cut.

At the smoother 106 of FIG. 3, the weighted averages of the two CSP coefficients $\phi_{1r}$ and $\phi_{2r}$ are determined in the time-direction, i.e., across plural frames as expressed in the following equations:

$$\bar{\phi}_{1r}(T) = \sum_{l=0}^{L-1} w(l)\phi_{1r}\left(T + l - \frac{L}{2}\right) \quad \text{Equation 3}$$

$$\bar{\phi}_{2r}(T) = \sum_{l=0}^{L-1} w(l)\phi_{2r}\left(T + l - \frac{L}{2}\right), \quad \text{Equation 4}$$

where W(I) is a given weight and L is a smoothing range. Thus, more stabilized expressions can be obtained. Although the typical L value is 10, it is not limited to 10. Another numeric value can be set depending on the design.

Next, at the peak detector 108, the maximum values of the above two CSP coefficients after smoothing, are tracked to acquire peak positions $d_1(T)$ and $d_2(T)$. A technique known in the art, such as dynamic programming, abbreviated as DP, the Kalman filter, or particle filtering, can be used for keeping track of maximum values.

In one embodiment, DP can be used for keeping track of maximum values at the peak detector 108.

If the kth element of the above $\bar{\phi}_{1r}(T)$ is $\bar{\phi}_{1r,k}(T)$, then evaluation functions $\psi_1$ and $\psi_1$ are given as expressed in the following equations:

$$\Psi_1(k, T) = \bar{\phi}_{1r,k}(T) \cdot L(j, k) + \max_{k-1 \leq j \leq k+1}(\Psi_1(j, T-1)) \quad \text{Equation 5}$$

$$\Psi_2(k, T) = \bar{\phi}_{2r,k}(T) \cdot L(j, k) + \max_{k-1 \leq j \leq k+1}(\Psi_2(j, T-1)), \quad \text{Equation 6}$$

where L(j, k) is a transition value from j to k. Here, it is set larger as the difference between the two is smaller. The time series $d_1(T)$ and $d_2(T)$ of the peak position are given as a history of k to maximize the above evaluation functions $\psi_1$ and $\psi_2$, respectively. Use of DP simply makes it possible to obtain more continuous time series than in a case where k giving the maximum value for $\bar{\phi}_{1r,k}(T)$ is obtained.

Then, at the coordinate transformer 110, the coordinates are transformed into a coordinate representation easier to understand based on $d_1(T)$ and $d_2(T)$. Assuming that $d_1(T)$ and $d_2(T)$ take on positive values in the direction in which the signals of observed sound are observed ahead of a reference signal, i.e., in the direction of shorter propagation time, the distance from the speaker apparatus to each of the two microphones can be estimated or calculated as expressed in the following equations:

$$(\tau_0 - d_1(T)) \times \text{Sampling Interval (Time)} \times \text{Sound Velocity} \quad \text{Equation 7}$$

$$(\tau_0 - d_2(T)) \times \text{Sampling Interval (Time)} \times \text{Sound Velocity}, \quad \text{Equation 8}$$

where $\tau_0$ is the amount of delay equivalent to part of the signal of the observed sound propagated in the air. Although the signal of the observed sound goes through an audio device, since a buffer for temporary storage of data is generally inserted in the audio device, an amount $\tau_D$ of delay associated with it occurs. Since the amount $\tau_D$ of delay can be checked beforehand, $\tau_0$ can be determined by deducting $\tau_D$ from the above amount τ of delay. Thus, $d_1(T)$ and $d_2(T)$ can be transformed into positions on a two-dimensional map. Information of the positions on this two-dimensional map can be used by simulation or game software to improve the interest for a user, for example, by displaying changes in position of a user who operates a remote control in the operation of a personal simulation or game machine.

Preferably, this two-dimensional map may be mapped within the horizontal plane in a space where a device for performing the sound-source position detecting method according to an embodiment of the present invention is used. Thus, in the sound-source position detecting method according to an embodiment of the present invention, the arrival time calculated based on the CSP coefficients is replaced with the two-dimensional coordinates mapped in front of a television set or display to enable detection of a two-dimensional position of the speaker apparatus in the remote control.

Figure 5:
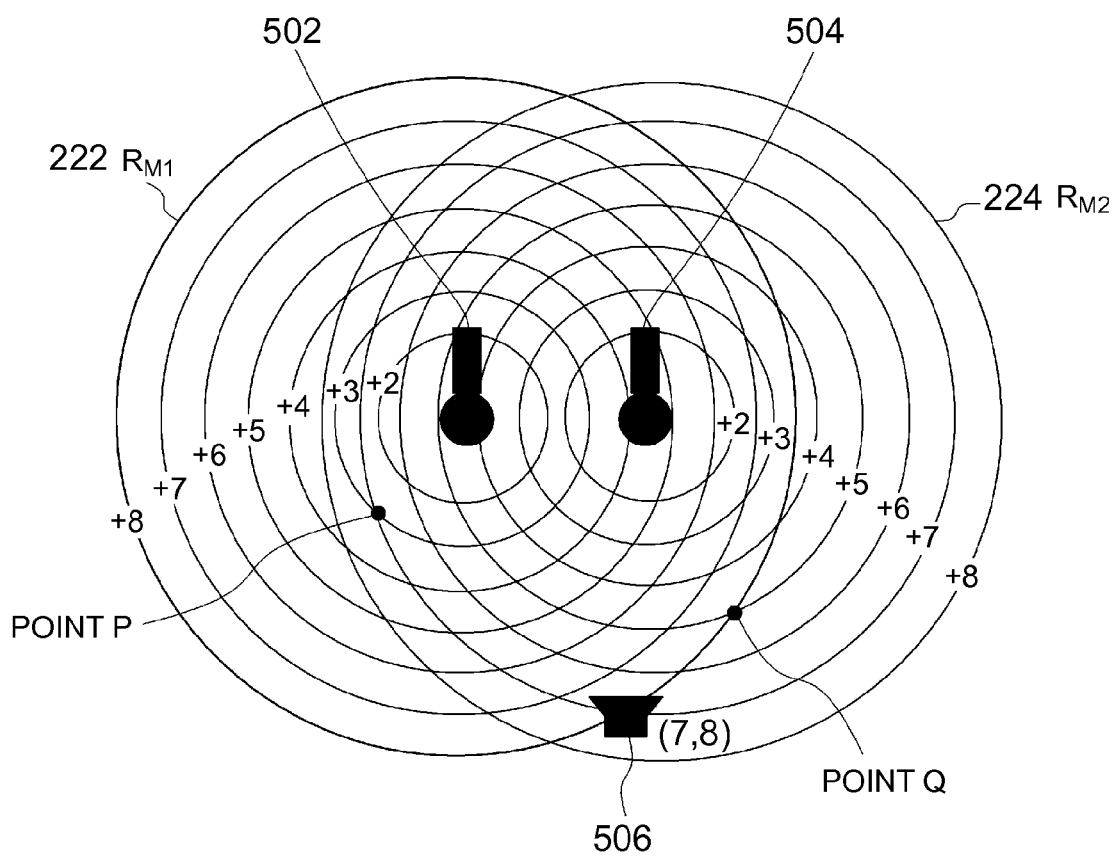
FIG. 5 is a diagram showing an example of coordinates for the sound-source position detecting method for the sound source based on distances from two microphones according to an embodiment of the present invention.

FIG. 5 shows an example of coordinates for the sound-source position detecting method based on distances from the two microphones according to an embodiment of the present invention. FIG. 5 typically represents a situation where the microphone 1, 502, and the microphone 2, 504, are viewed from above. Here, plural concentric circles are considered.

The circles are centered on the respective microphones. Each circle has a radius corresponding to the distance for which the arrival time calculated based on the CSP coefficient is scaled.

For example, distance $R_{M1}$, 222, from the microphone 1 centered on the microphone 1, 502, and distance $R_{M2}$, 224, from the microphone 2 centered on microphone 2, 504, are selected, and 2-dimensional coordinates, $(R_{M1},R_{M2})$, using these distances as elements are further selected. For example, in the 2-dimensional coordinates, point P shown in FIG. 5 is positioned at 2-dimensional coordinates, (3,7), and point Q is represented as 2-dimensional coordinates, (8,5).

For example, when a sound from the speaker apparatus 506 is observed at the microphone 1, 502, and the microphone 2, 504, if distance $R_{M1}$=7 and distance $R_{M2}$=8 are calculated using the sound-source position detecting method according to an embodiment of the present invention, the position of speaker apparatus 506 is defined by its two-dimensional coordinates, (7, 8). Thus, the absolute position of the sound source such as the speaker apparatus 506 in the front-to-back and right-to-left directions can be obtained based on the distances from the two microphones.

The coordinate values shown in FIG. 5 have symmetry in the front-to-back direction of the microphone 1, 502, and the microphone 2, 504. However, if directional microphones having forward sensitivity are used as the microphones, sensitivity to a sound from behind is greatly reduced. Thus, the use of directivity of the microphones rules out the symmetric coordinate values for position detection.

Use of the Peak Detector 108

In the sound-source position detecting method according to an embodiment of the present invention as above with reference to FIG. 3, the CSP coefficients are calculated between the signal of known reproduced sound and the signals of observed sound of the two microphones, and used for position detection of the sound source. In other words, $\phi_{1r}$ and $\phi_{2r}$ shown in the equations 1 and 2 are used for calculations of the CSP coefficients. Further, in the sound-source position detecting method according to an embodiment of the present invention, a CSP coefficient between the signals of observed sound of the two microphones can be calculated for use in position detection of the sound source.

Figure 6:
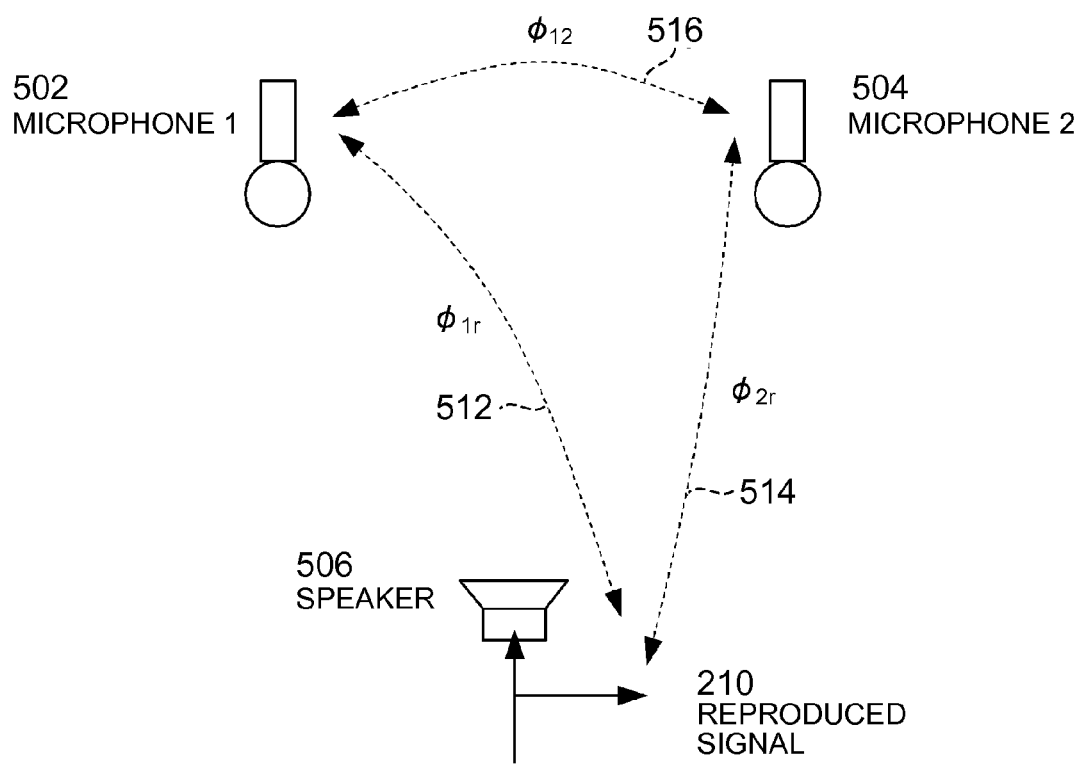
FIG. 6 is a diagram illustrating relationships between microphones and CSP coefficients according to an embodiment of the present invention.

FIG. 6 illustrates relationships between microphones and CSP coefficients according to one embodiment of an embodiment of the present invention. The speaker apparatus 506 can move, for example, in directions illustrated by solid arrows while emitting a known sound effect such as a reproduced signal 210. In the position detection of the sound source as above with reference to FIG. 3, $\phi_{1r}$, 512, and $\phi_{2r}$, 514, are calculated CSP coefficients. Further, according to an embodiment of the present invention, $\phi_{12}$, 516, is used at the same time as a CSP coefficient.

Figure 7:
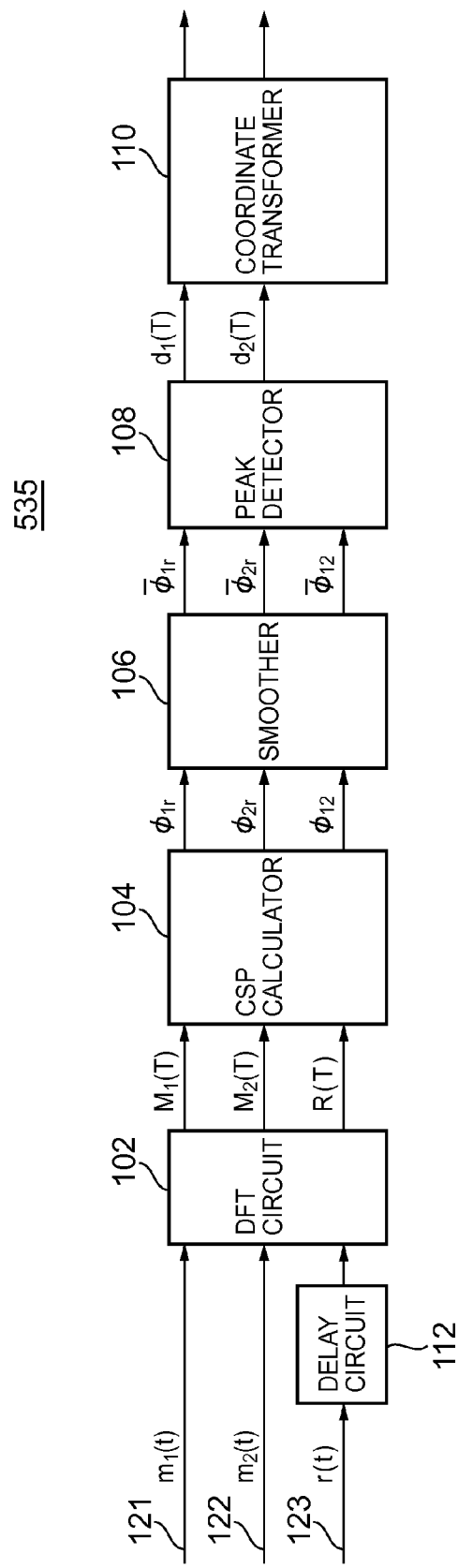
FIG. 7 is a diagram showing the structure of a position estimating apparatus section 535 as another embodiment in the position detecting device 500 according to an embodiment of the present invention.

FIG. 7 shows the structure of a position estimating apparatus section 535 as another embodiment of the sound position detecting device 500. In the position estimating apparatus section 535, the CSP coefficient, $\phi_{12}$, between the signals of observed sound of the two microphones is used in addition to the CSP coefficients between the reproduced signal itself and the signals of observed sound through the respective microphones, $\phi_{1r}$ and $\phi_{2r}$, in FIG. 3. Though there is no large change from the position estimating apparatus section 530 shown in FIG. 3, processing related to $\phi_{12}$ is added as follows.

In this embodiment, the position estimating apparatus section 535 of the sound position detecting device 500 according to an embodiment of the present invention adds the following calculation of a CSP coefficient to the CSP calculator 104.

$$\phi_{12}(T) = iDFT\left(\frac{M_1(T)M_2(T)^*}{|M_1(T)||M_2(T)|}\right) \quad \text{Equation 9}$$

At the smoother 106, the following additional processing is performed.

$$\bar{\phi}_{12}(T) = \sum_{l=0}^{L-1} w(l)\phi_{12}\left(T + l - \frac{L}{2}\right) \quad \text{Equation 10}$$

The peak detector 108 simultaneously uses $\bar{\phi}_{1r}(T)$, $\bar{\phi}_{2r}(T)$, and $\bar{\phi}_{12}(T)$ to track optimum peaks.

In this embodiment, the peak detector 108 of the device for performing the sound-source position detecting method according to an embodiment of the present invention can use DP for peak detection. The evaluation function $\psi$ in this case is expressed in the following equations:

$$\Psi(k1, k2, T) = \quad \text{Equation 11}$$
$$C_{1r} \cdot \bar{\phi}_{1r,k1}(T) \cdot L(j1, k1) + C_{2r} \cdot \bar{\phi}_{2r,k2}(T) \cdot L(j2, k2) +$$
$$C_{12} \cdot \bar{\phi}_{12,(k1-k2)}(T) \cdot L(j1 - j2, k1 - k2) +$$
$$\max_{\substack{k1-1 \leq j1 \leq k1+1 \\ k2-1 \leq j2 \leq k2+1}} (\Psi_1(j1, j2, T-1))$$

where $C_{1r}$, $C_{2r}$, and $C_{12}$ are constants for adjusting the weight of each item. $L(j,k)$ is a transition value from j to k, which is selected to be larger as the difference between the two decreases. The time series $d_1(T)$ and $d_2(T)$ of the peak position are given as parameters $k_1$ and $k_2$ to maximize the above evaluation function $\psi$.

EXAMPLE

As an example of the sound-source position detecting method according to an embodiment of the present invention, position detection of a signal sound source with the presence of an interfering sound source is shown. In the following example, the speech of a male speaker apparatus was used as the interfering sound source and white noise was used as the signal sound source. First, after the interfering sound source and the signal sound source were observed and acquired separately, the amplitude of each of the acquired sound sources was adjusted so that they would come with a predetermined signal-to-noise (SN) ratio, about −15 dB to mix sounds for each of the two channels. Note that the interfering sound source has an amplitude larger than the signal sound source.

Table 1 shows experimental conditions for position detection using the sound position detecting device according to an embodiment of the present invention. Table 2 shows a list of speaker apparatus positions in respective experimental examples.

TABLE 1

| Item | Experimental Condition |
| --- | --- |
| Microphone Interval | 24 cm |
| Sampling Frequency | 22.05 kHz |
| Observation Site | Ordinary Office Room, Without Sound Proofing |

TABLE 1-continued

| Item | Experimental Condition |
| --- | --- |
| Signal Sound Source | White Noise |
| Interfering Sound Source | Male Speaker apparatus |

TABLE 2

Figure 8:
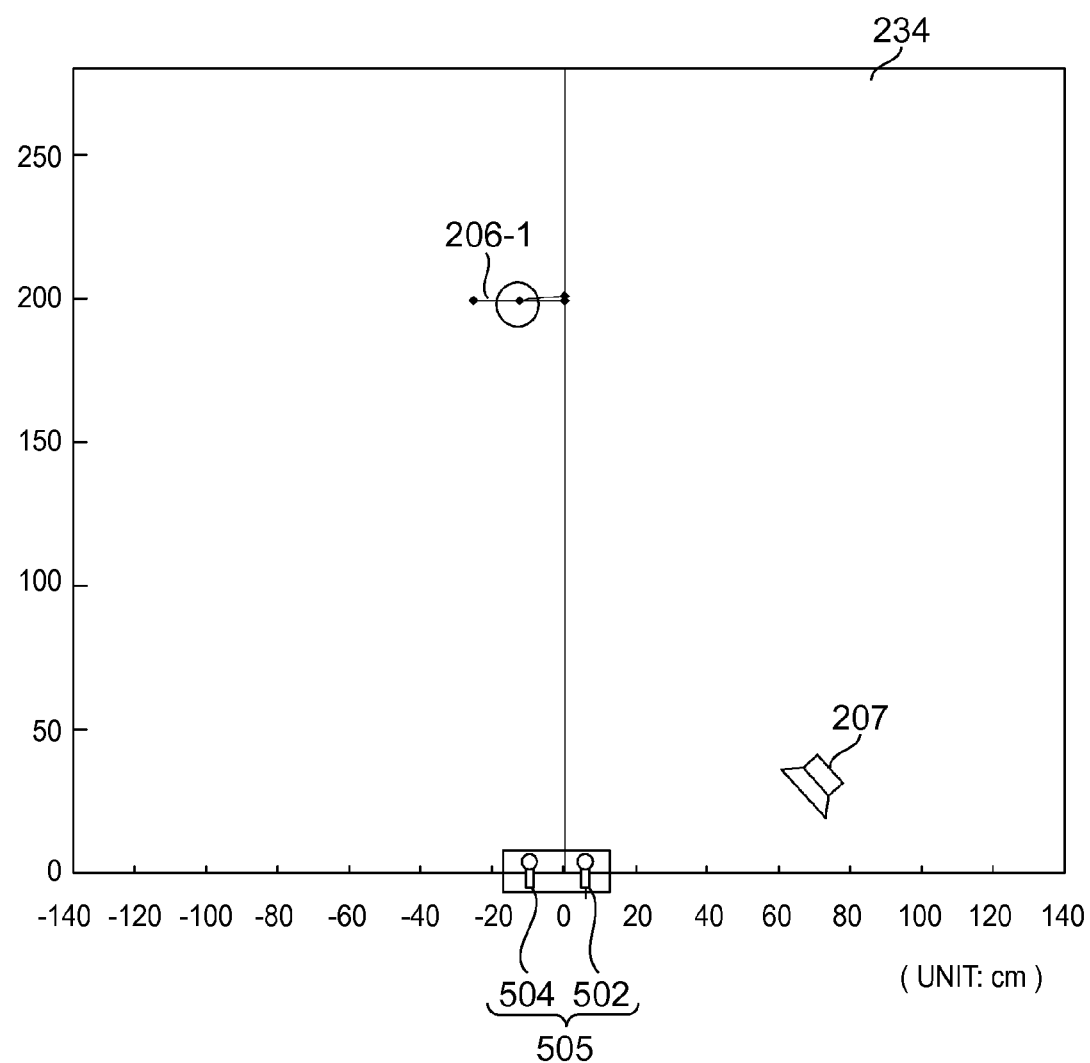
FIG. 8 is a diagram showing the results of position detection by the sound-source position detecting method according to the present invention when the position of a signal sound source is fixed according to an embodiment of the present invention.
Figure 9:
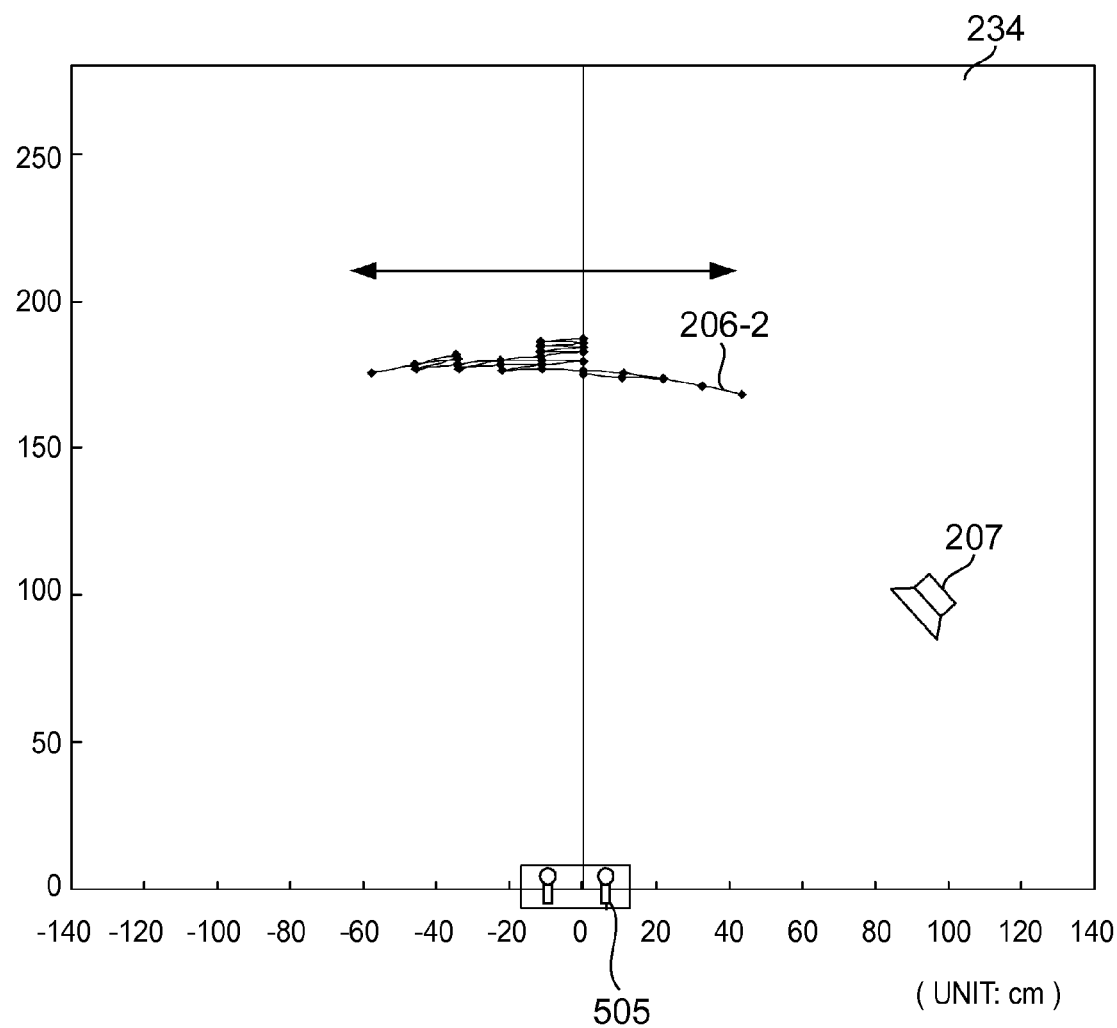
FIG. 9 is a diagram showing the results of position detection by the sound-source position detecting method according to the present invention when the position of the signal sound source is moved to right and left according to an embodiment of the present invention.
Figure 10:
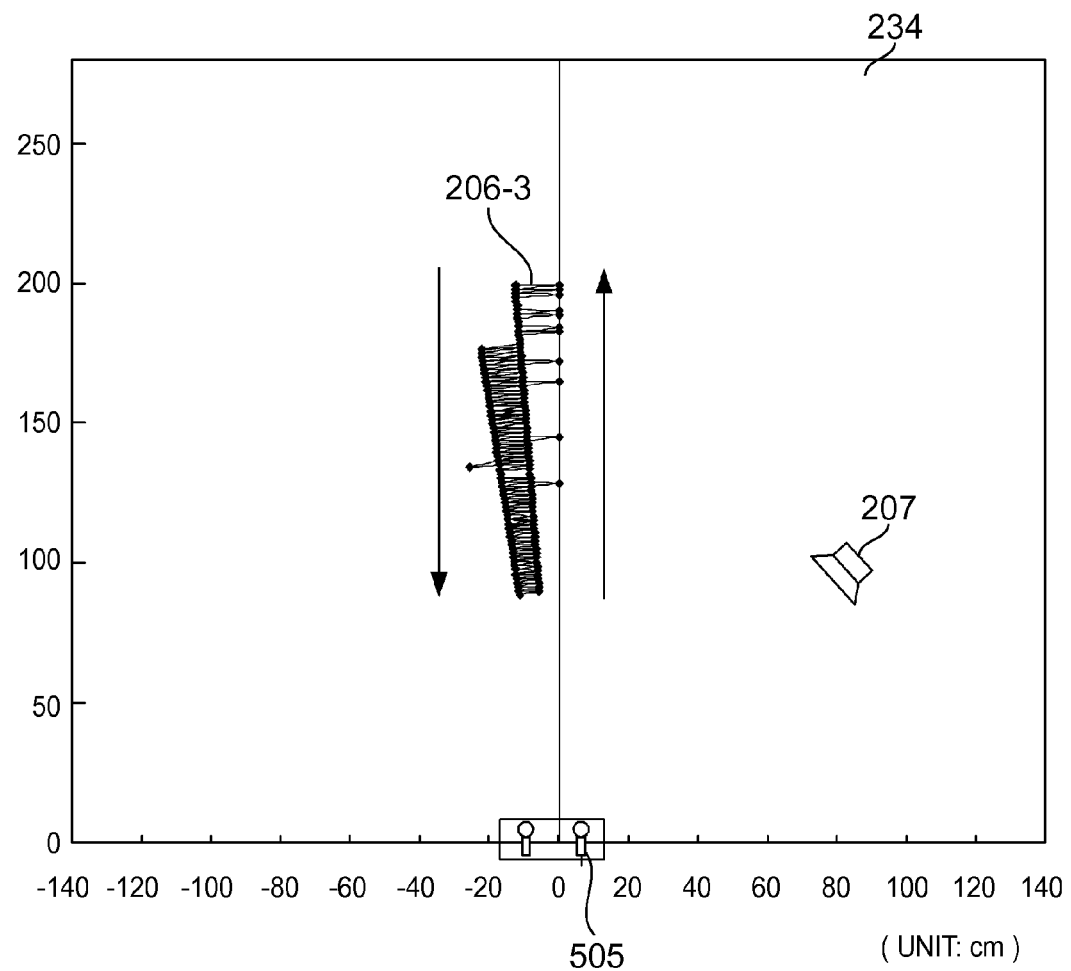
FIG. 10 is a diagram showing the results of position detection by the sound-source position detecting method according to the present invention when the position of the signal sound source is moved back and forth according to an embodiment of the present invention.
Figure 11:
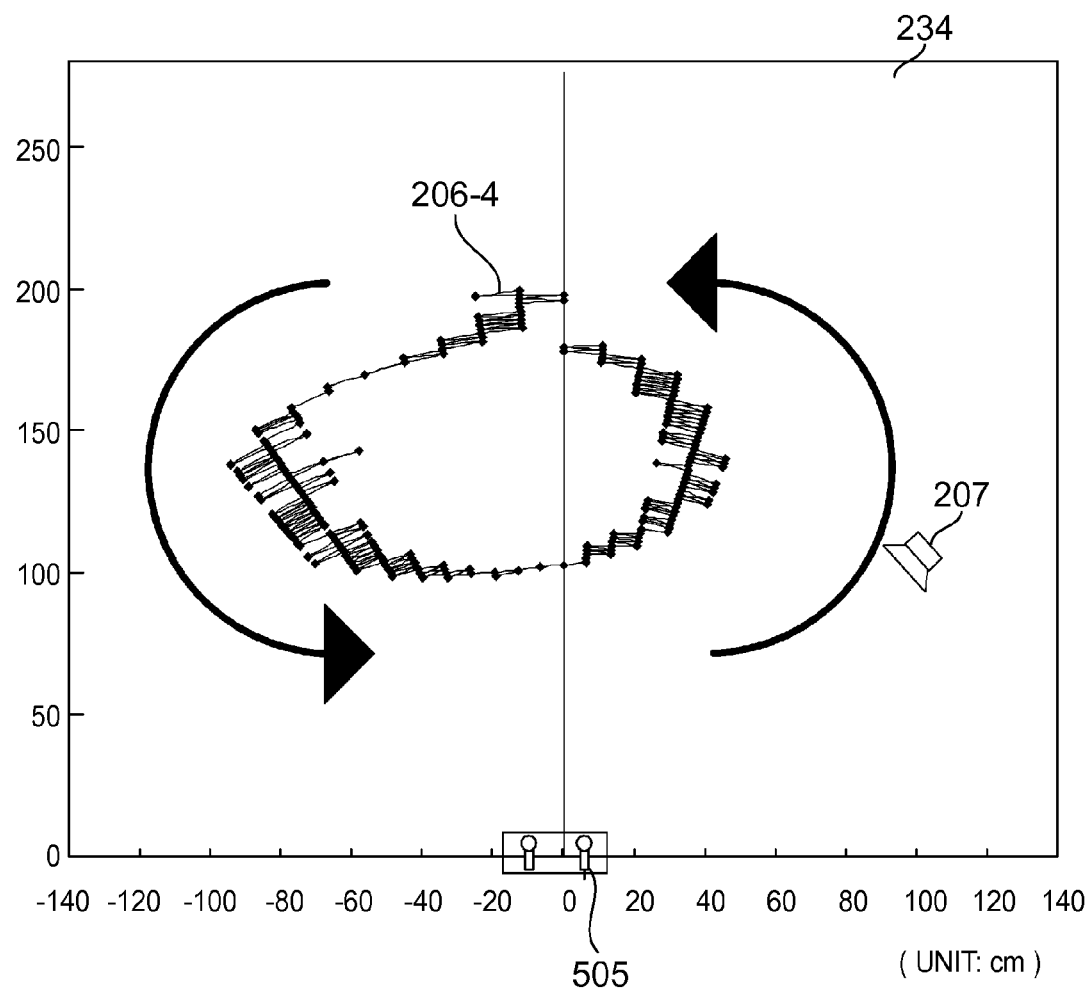
FIG. 11 is a diagram showing the results of position detection by the sound-source position detecting method according to the present invention when the position of the signal sound source is moved to draw a circle according to an embodiment of the present invention.

| Experimental Example | Speaker apparatus Position | FIG. |
| --- | --- | --- |
| Experimental Example 1 | Fix speaker apparatus, 206-1, as signal sound source at about 2 m distance in front of microphones | FIG. 8 |
| Experimental Example 2 | Move speaker apparatus, 206-2, as signal sound source in right-to-left direction at about 2 m distance in front of microphones | FIG. 9 |
| Experimental Example 3 | Move speaker apparatus, 206-3, as signal sound source in front-to-back direction at about 2 m distance in front of microphones | FIG. 10 |
| Experimental Example 4 | Move speaker apparatus, 206-4, as signal sound source at about 2 m distance in front of microphones in such a manner to draw a circle | FIG. 11 |

In FIG. 8 to FIG. 11 to be described below, an orthogonal coordinate system representing right-to-left and front-to-back coordinates is set within a plane including a signal sound source for position detection and two microphones. The detected positions are arranged within the plane having those coordinate axes. The origin of the coordinate axes is set at the midpoint of a line segment that connects the two microphones. Distance from the microphones toward the signal sound source is set in the front-to-back direction. The signal sound source generates white noise reproduced from a speaker apparatus 206, 206-1, 206-2, 206-3, and 206-4 respectively in FIG. 8 to FIG. 11. The interfering sound source is the speech of a male speaker apparatus reproduced from a speaker apparatus 207.

Experimental Example 1

Fixed Signal Sound Source

FIG. 8 shows the results of position detection by the sound-source position detecting method according to an embodiment of the present invention when the speaker apparatus, 206-1, of the signal sound source was fixed at about 2 m distance from the microphone array 505 in the front direction of the microphone array 505. In this case where there was an interfering sound from the speaker apparatus 207, the signal sound source was detected at a fixed point. The positions of the signal sound source were located by the experiment.

Experimental Example 2

Moving Signal Sound Source Right-to-left

FIG. 9 shows the results of position detection by the sound-source position detecting method according to an embodiment of the present invention when the speaker apparatus, 206-2, of the signal sound source, spaced about 2 m distance from the microphone array 505 in front of the microphone array 505, was moved to right and left. In this case where there was an interfering sound from the speaker apparatus 207, the positions of the detected signal sound source were detected at ten points with a spatial resolution within a range of about plus or minus 50 cm spaced at locations about 1.7 to 1.8 m distance from the microphone array 505. Thus, the positions of the signal sound source were located by the experiment.

Experimental Example 3

Signal Sound Source Moved Back and Forth

FIG. 10 shows the results of position detection by the sound-source position detecting method according to an embodiment of the present invention when the speaker apparatus, 206-3, of the signal sound source spaced about 2 m distance from the microphone array 505 in front of the microphone array 505 was moved back and forth. In this case where there was an interfering sound from the speaker apparatus 207, the positions of the detected signal sound source were detected at about 80 points with a spatial resolution within a range of about 0.8 to 2 m in the front-to-back direction from the microphone array 505 within a coordinate plane 234. Thus, the positions of the signal sound source were located by the experiment.

Experimental Example 4

Signal Sound Source Moved in a Circle

FIG. 11 shows the results of position detection by the sound-source position detecting method according to an embodiment of the present invention when the speaker apparatus, 206-4, of the signal sound source is placed about 2 m from the microphone array 505 in front of the microphone array 505, and is moved in a circle. In this case, where there was an interfering sound from the speaker apparatus 207, the signal sound source was detected at 15 points in the right-to-left direction and 65 points in the front-to-back direction over a range of about −100 to 40 cm. Thus, the positions of the signal sound source were located by the experiment.

In the sound-source position detecting method according to an embodiment of the present invention, the front-to-back and right-to-left movements can be tracked as shown in these experimental examples even if there is an interfering voice or sound.

Example

Support for Multiple Players using Divided Frequency Bands

In the sound-source position detecting method according to an embodiment of the present invention, the frequency band to be used is so divided that respective positions of multiple players can be detected using a position detection device for a single sound source.

Figure 12:
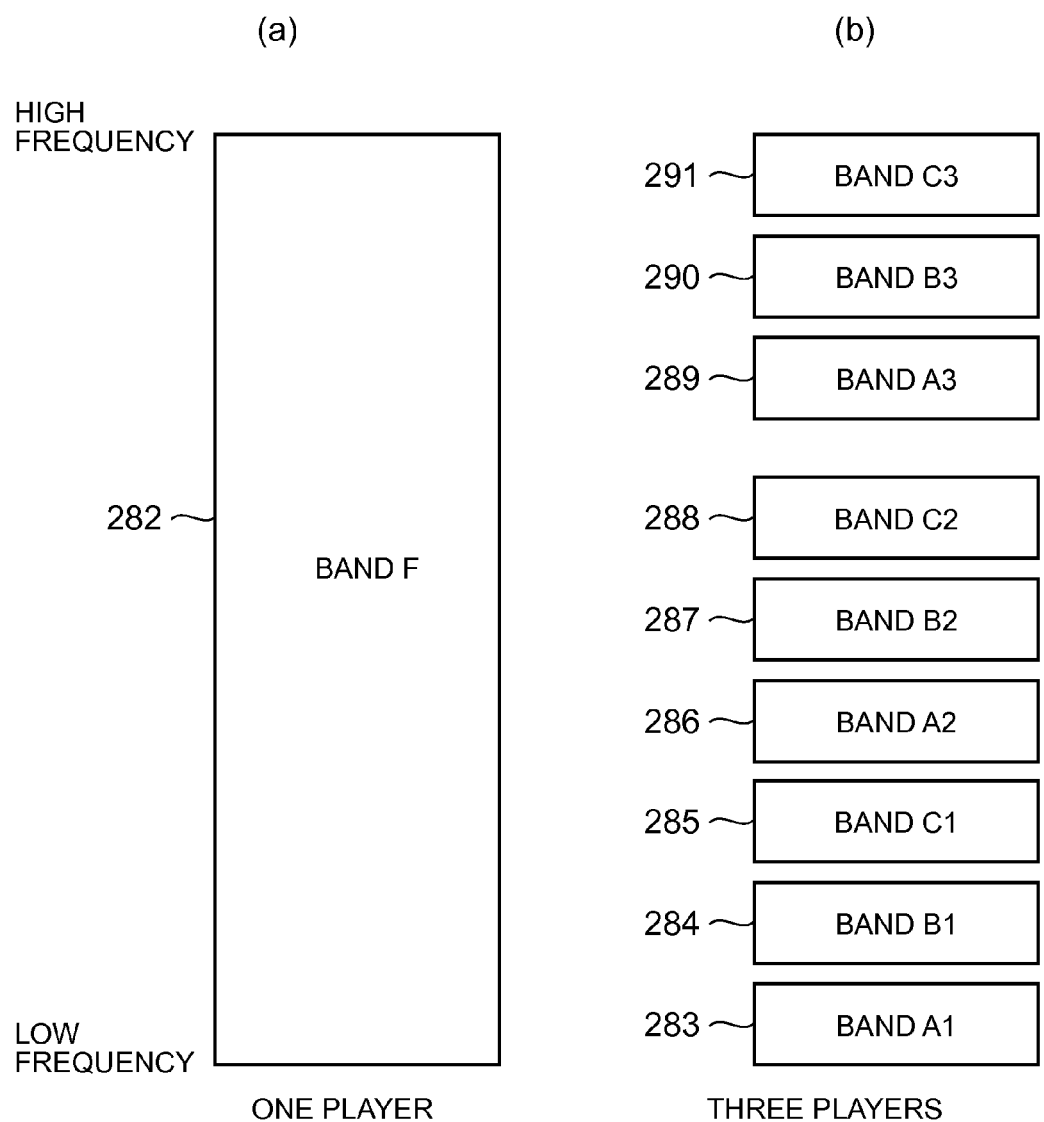
FIG. 12 is a diagram illustrating division of frequency band by the sound-source position detecting method according to an embodiment of the present invention.

FIG. 12 illustrates division of frequency band by the sound-source position detecting method according to an embodiment of the present invention. In FIGS. 12(*a*) and 12(*b*), the vertical direction corresponds to different frequencies. Preferably, each of the divided frequency bands does not substantially overlap the other frequency bands, and each is used for position detection of a specific player.

FIG. 12(*a*), shows that a band F, 282, i.e., any band from low to high frequency, can be used as a known audio signal for position detection by the sound-source position detecting method according to an embodiment of the present invention when the number of users of simulation or game software is only one.

FIG. 12(*b*) represents the division of known audio signal for position detection into multiple frequency bands. In other words, if the number of users of the simulation or game software is three. Player A can use bands A1, 283, A2, 286, and A3, 289, player B can use bands B1, 284, B-2, 287, and B3, 290, and player C can use bands C1, 285, C2, 288, and C3, 291, as known audio signals for position detection by the sound-source position detecting method according to an embodiment of the present invention. Each of the audio signals for position detection divided into multiple frequency bands is transformed by the DFT circuit 102, shown in FIG. 3, into a frequency spectrum so that it can be distinguished as an audio signal having a different frequency component. Further, at the CSP calculator 104, shown in FIG. 3, band limiting can be performed suitably for each user. The number of users is not limited to three, and can be set appropriately.

Example

Support for Multiple Players by Division in the Time Domain

Figure 13:
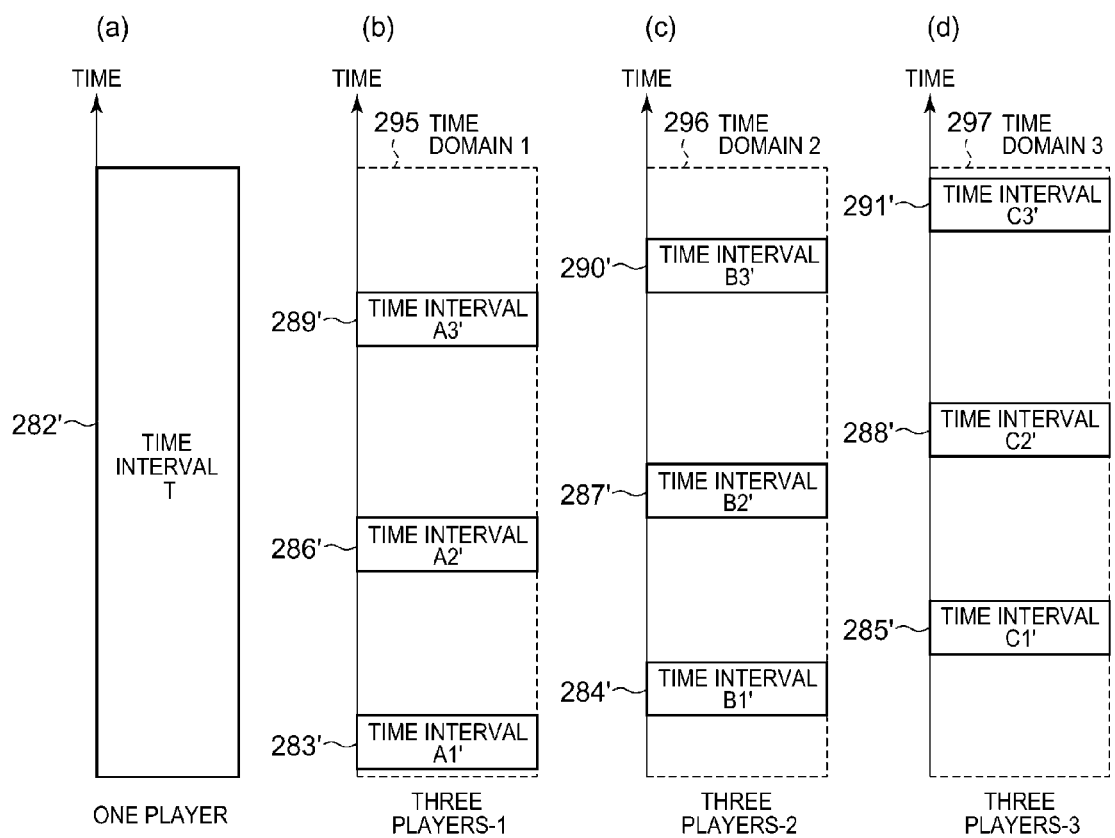
FIG. 13 is a diagram illustrating division of frequency band by the sound-source position detecting method according to an embodiment of the present invention.

FIG. 13 illustrates division in the time domain by the sound-source position detecting method according to one embodiment of the present invention. Columns (a) to (d) in FIG. 13 show that the time domain is divided such that respective users using the sound-source position detecting method according to an embodiment of the present invention can use frequency bands shown in FIG. 12(b). In other words, FIG. 13(a) represents the usage of the time domain in the case of one player. Additionally, FIGS. 13(b) to 13(d) represent the situation where the time domain is divided into time intervals in the case of three players.

For example, time domain 1, 295, obtained by dividing time into certain time intervals is assigned to allow player A to use time intervals A1', 283', A2', 286', and A3'289'. Subsequent time domain 2, 296, is assigned to allow player B to use time intervals B1', 284', B-2', 287', and B3', 290'. Further subsequent time domain 3, 297, is assigned to allow player C to use time intervals C1', 285', C2', 288', and C3', 291'.

The division of the time domain shown in FIG. 13 may be combined with the division of the frequency band shown in FIG. 12. For example, the sound-source position detecting method according to an embodiment of the present invention can be performed using a frequency band not used by player A in the time domain 1, 295, i.e., any frequency band that does not overlap the bands A1, 283, A2, 286, and A3, 289, in FIG. 12 within the frequency band F, 282 shown in FIG. 12.

Thus, in the sound-source position detecting method according to an embodiment of the present invention, the use of the division of time domain makes it possible for more users to simultaneously use the sound-source position detecting method according to an embodiment of the present invention.

Reproduction Method for Background Sounds not used for Position Detection

Figure 14:
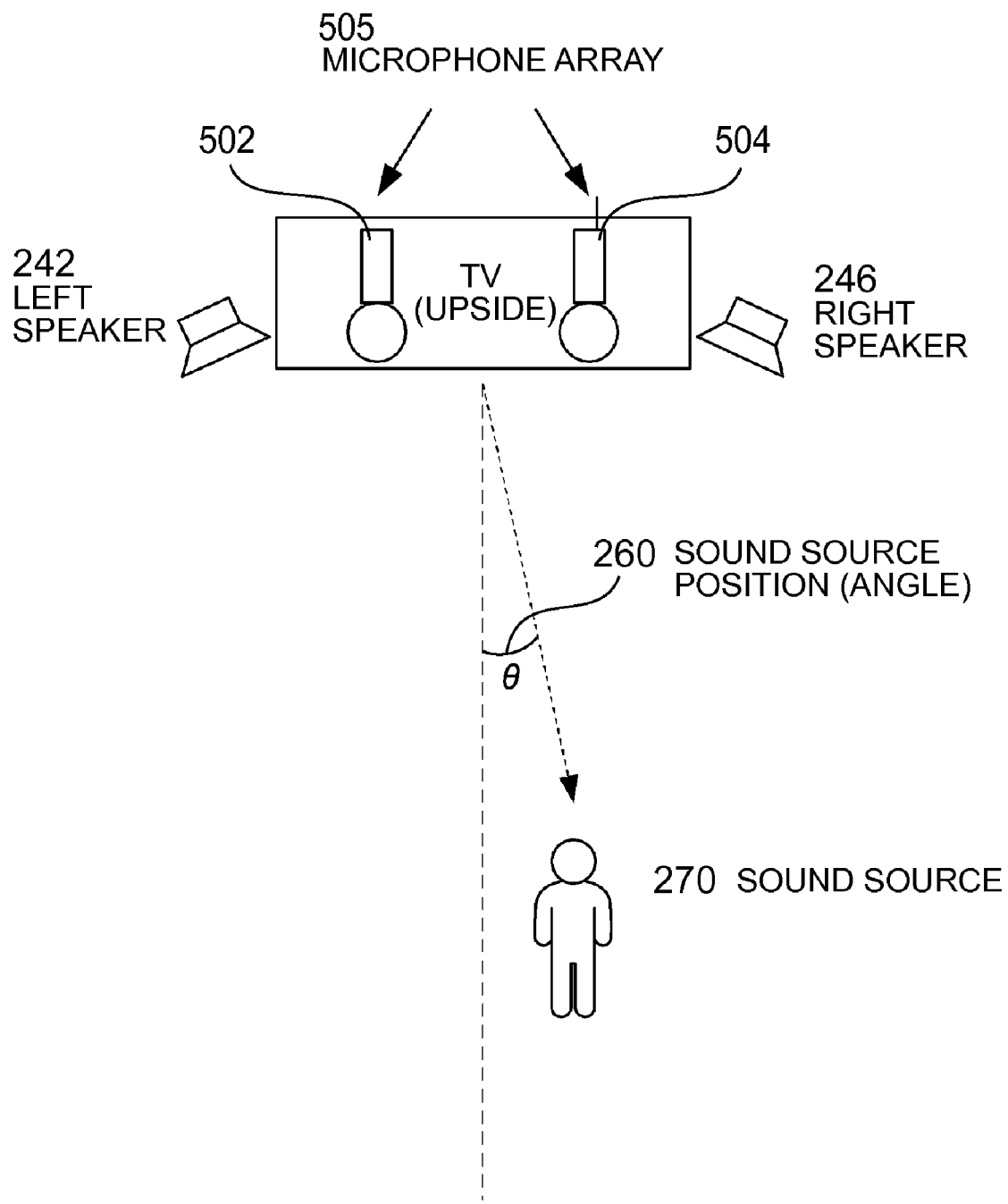
FIG. 14 is a diagram illustrating a method of reproducing BGM according to an embodiment of the present invention.

FIG. 14 illustrates a reproduction method for background sounds not used for position detection according to one embodiment of the present invention. Here, the background sounds not used for position detection appropriately include music such as BGM played back based on the operating situation of the simulation or game software, a sound effect for motion in a simulation or game character, and an environmental sound such as the sound of a virtual river or field included in a simulation or game scene. These background sounds not used for position detection are categorized as interfering sounds, which can increase the chance of detection errors, different from the known audio signal for position detection.

In FIG. 14, the device for performing the sound-source position detecting method according to an embodiment of the present invention uses the microphone array 505 to detect the spatial position of a sound source 270 based on a given reproduced signal for position detection. Here, the microphone array 505 includes the microphone 1, 502, and the microphone 2, 504. The reproduced sounds such as BGM are reproduced from a left speaker apparatus 242 and a right speaker apparatus 246. The sound source 270 has an angle θ, 260, of its sound source position with respect to a straight line intersecting the midpoint of a line segment connecting the microphone 1, 502, and the microphone 2, 504. The angle θ, 260, of the sound source position is preferably plus or minus 30 degrees or less, more preferably plus or minus 20 degrees or less, and most preferably plus or minus 45 degrees or less.

In one embodiment, a user of the sound-source position detecting method according to an embodiment of the present invention is located around the center line as seen from the microphone array 505, using simulation or game software using the position detection for a remote control. In the sound-source position detecting method according to an embodiment of the present invention, a background sound not used for position detection is reproduced as monaural sounds using the left speaker apparatus 242 and the right speaker apparatus 246, with the reproduced sound from one speaker apparatus being delayed a certain time from or delivered a certain time ahead of the other speaker apparatus. Preferably, the delay or advance time falls within a range from a few milliseconds to a few ten milliseconds.

In another embodiment, a user of the sound-source position detecting method according to an embodiment of the present invention is located around the center line as seen from the microphone array like in the above-mentioned embodiment. In the sound-source position detecting method according to an embodiment of the present invention, although the background sound not used for position detection is reproduced as monaural sounds using the left speaker apparatus 242 and the right speaker apparatus 246, the sound-source position detecting method in this embodiment is configured to reverse the phase of the reproduced sound from one speaker apparatus relative to the phase of the reproduced sound from the other speaker apparatus.

In still another embodiment, the device for performing the sound-source position detecting method according to an embodiment of the present invention can reproduce, in the form of two monaural sounds, the background sound to be reproduced during a time period in which the simulation or game software uses the position detection of the user in such a manner that one reproduced sound is delayed a certain time from or delivered a certain time ahead of the other, or the phase of one background sound is reversed relative to the phase of the other background sound. For other background sounds to be reproduced during a time period for which the simulation or game software does not use the position detection of the user, the above process may be omitted. In such a case, for example, the background sounds may be reproduced in the form of stereo sounds.

Thus, in the sound-source position detecting method according to an embodiment of the present invention, the background sound not used for position detection is not placed in a fixed position around the center region line of the two microphones. Therefore, when the user is located around the center line as seen from the microphone array and the sound-source position detecting method according to an embodiment of the present invention is used to detect the position of the sound source located mostly around the center region of the microphones, then, the background sound not used for position detection is not a problem.

Apparatus System for Position Detection of a Sound Source

Figure 15:
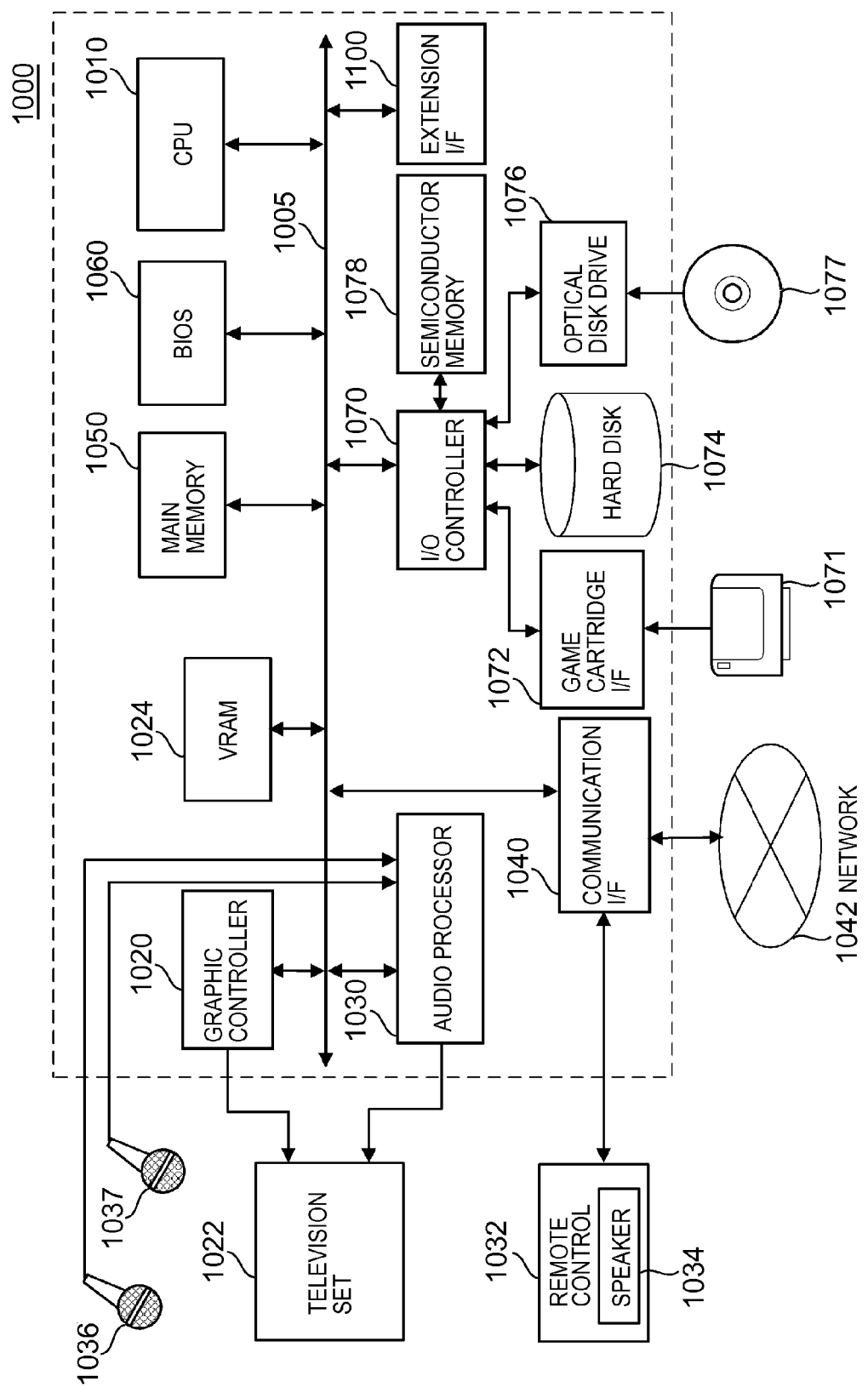
FIG. 15 is a block diagram showing a hardware structure for position detection of a sound source according to an embodiment of the present invention.

FIG. 15 shows apparatus for position detection of a sound source according to one embodiment of an embodiment of the present invention. In FIG. 15, an information processing apparatus 1000 is used as the sound position detecting device, and its hardware structure is illustrated. Although the following describes the apparatus as an information processing apparatus typified by a computer, it is needless to say that the basic structure can be selected according to the application for use.

The Information processing apparatus 1000 includes a CPU, Central Processing Unit, 1010, a bus line 1005, a communication interface, I/F, 1040, a main memory 1050, a BIOS, Basic Input Output System, 1060, a graphic controller 1020, a VRAM 1024, an audio processor 1030, an I/O controller 1070, and an extension interface 1100 as needed. Storage means, such as a simulation or game cartridge interface, I/F, 1072, a hard disk 1074, an optical disk drive 1076, and a semiconductor memory 1078, can be connected to the I/O controller 1070.

In the embodiment, microphones 1036, 1037, and external audio input means of a television set or display 1022 are connected to the audio processor 1030. External video input means for the television 1022 is connected to the graphic controller 1020. In other words, audio and video can be provided from the TV set 1022 to the user according to the operation of the simulation or game software.

The microphones 1036 and 1037 connected to the audio processor 1030 can be the microphone 1, 502, and the microphone 2, 504, included in the microphone array 505 shown in FIG. 1. For example, the microphones 1036 and 1037 are installed on the top of or near the cabinet of the television set 1022, and are used to receive audio signals for detecting the position of a remote control 1032.

In another embodiment, the microphones 1036 and 1037 are included in a microphone array device provided with an A/D converter, not shown, and are capable of outputting digitally coded audio signals, and can be connected to the information processing apparatus 1000 through the extension I/F 1100 or the simulation or game cartridge I/F 1072. The user of the device thus configured to perform the sound-source position detecting method according to an embodiment of the present invention can connect a connection cable from the microphone array to the simulation or game cartridge I/F 1072 when use of the sound-source position detecting method is desired. Connection cables can be removed when not in use.

The communication I/F 1040 is connected to the remote control 1032 by wire or wireless communication to receive information on user's operation according to the operation of the simulation or game software executed by the CPU 1010, and to send an audio signal to a built-in speaker apparatus 1034 of the remote control 1032 or send a control signal to control timing for reproducing a given audio signal. Preferably, the connection between the communication I/F 1040 and the remote control 1032 is wireless. The communication I/F 1040 may also be connected appropriately to a network 1042 such as the Internet.

The BIOS 1060 stores a boot program executed by the CPU 1010 upon startup of the information processing apparatus 1000, programs dependent on the hardware of the information processing apparatus 1000, and other programs needed. The simulation or game cartridge I/F 1072 reads a program or data from a simulation or game cartridge 1071, and provides it to the main memory 1050 or the hard disk 1074 through the I/O controller 1070. Although FIG. 15 shows, for example, incorporating the hard disk 1074 inside the information processing apparatus 1000, it may also be configured to connect an external device connection interface, not shown, to the bus line 1005 or the I/O controller 1070 in order to connect or install a hard disk drive outside of the information processing apparatus 1000.

The optical disk drive 1076 can be a DVD-ROM drive, a CD-ROM drive, a DVD-RAM drive, a CD-RAM drive, etc. In either case, it is necessary to use an optical disk 1077 supported by an appropriate drive. The optical disk drive 1076 can also read a program or data from the optical disk 1077 to provide it to the main memory 1050 or the hard disk 1074 through the I/O controller 1070.

A computer program provided to the processing apparatus 1000 is stored on a recording medium, such as the simulation or game cartridge 1071, the optical disk 1077, or a memory card, and is provided by the user. This computer program is read from the recording medium through the I/O controller 1070, or downloaded from the network 1042 through the communication I/F 1040, and installed in and executed by the information processing apparatus 1000. Since the operation that the computer causes the information processing apparatus to perform is the same as the operation of the above-described device, its description is omitted.

The above computer program may be stored on an external storage medium. In addition to the simulation or game cartridge 1071, the optical disk 1077, or the memory card, a magneto-optical recording medium such as a magnetic MD or a tape medium can be used as the storage medium. Further, a storage device, such as a hard disk or an optical disk library, provided in a server system connected to a dedicated communication line or the Internet may be used as a recording medium to provide the computer program to the information processing apparatus 1000 through the communication line.

The above example was used to describe the information processing apparatus 1000, but a program having the functions described in the information processing apparatus can be installed on a computer to allow the computer to function as the information processing apparatus in order to implement the same functions as those of the above-referenced information processing apparatus.

The device can be realized by hardware, software, or a combination of hardware and software. In the case of use of a combination of hardware and software, a typical example is a computer system having a predetermined program. In this case, the predetermined program is loaded into and executed by the computer system to cause the computer system to perform the process according to an embodiment of the present invention.

The program consists of a set of instructions written in an appropriate language, code, or description. Such a set of instructions can be made executable after the system directly performs a specific function, or either or both of (1) they are converted to those in another language, code, or description, and (2) they are copied to another medium. Of course, the scope of the present invention includes not only the program itself, but also a program product including a medium storing the program. The program for performing the functions of an embodiment of the present invention is storable in any computer-readable tangible article of manufacture, such as a flexible disk, MO, CD-ROM, DVD, hard disk drive, ROM, MRAM, RAM, or a flash memory. To store the program on the computer-readable medium, the program can be downloaded from another computer system connected by a communication line, or copied from another medium. Further, the program can be compressed, or divided into multiple parts to be stored on a single recording medium or multiple recording media.

While the present invention has been described with reference to what are presently considered to be the preferred embodiments, it is to be understood that the present invention is not limited to the disclosed embodiments. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A method for detecting the position of a sound source using two microphones, the method comprising the steps of:
   emitting a first sound (reproduced sound) from the sound source;
   detecting the first sound and a second sound (observed sound) at two microphones;
   converting the first sound and the second sound into electrical signals by the microphones;
   transforming the signals of the first and the second sounds into frequency spectra by a frequency spectrum transformer apparatus;
   calculating Crosspower Spectrum Phase (CSP) coefficients of the frequency spectra of the signals by a CSP coefficient calculator apparatus;
   tracking maximum values of the CSP coefficients using time as a variable;
   transforming the maximum values into distance information; and
   calculating distances between the position of the sound source and the positions of the microphones based on the calculated CSP coefficients by a distance calculating apparatus and based on the distance information, thereby determining a position of the sound source.

2. The method according to claim 1, further comprising the step of arranging the microphones within a two-dimensional plane which includes the position of the sound source.

3. The method according to claim 1, further comprising the step of performing a coordinate transformation on the calculated distances.

4. The method according to claim 1, further comprising the steps of:
   using at least two sound sources to emit the first sounds:
   assigning frequency bands to the signals of the first sounds divided into a number of frequency bands equal or greater than the number of sound sources; and
   associating the divided frequency bands with the first sounds emitted by the sound sources,
   wherein each step of the method is performed on each of the first sounds emitted by the sound sources in each frequency band.

5. The method according to claim 1, further comprising the steps of:
   using at least two sound sources to emit reproduced sounds; and
   associating each sound source with a time domain divided into time intervals,
   wherein each step of the method is performed on each of the first sounds emitted by the sound sources in each associated time domain.

6. The method according to claim 1, further comprising:
   reproducing monaural sounds;
   emitting the first sounds using two speakers spaced apart; and
   delaying one of the monaural sounds from the other or arranging the phases of the monaural sounds so that one is in opposite phase to the other.

7. The method according to claim 1, further comprising the step of eliminating interfering sounds.

8. A computer readable article of manufacture tangibly embodying computer readable instructions for executing a computer implemented method for detecting the position of a sound source according to claim 1.

9. A system for detecting the position of a sound source using at least two microphones, the system comprising:
   a sound source apparatus for emitting a first sound (reproduced sound);
   two microphones for detecting the first and a second sound (observed sound) at the microphones and for converting the first sound and the second sound into electrical signals;
   a frequency spectrum transformer apparatus for transforming the signals of the first sound and the second sounds into frequency spectra;
   a CSP coefficient calculator apparatus for calculating CSP coefficients of the frequency spectra of the signals of the first and second sounds;
   a tracking apparatus for tracking maximum values of the CSP coefficients using time as a variable;
   a transforming apparatus for transforming the maximum values the CSP coefficients into distance information; and
   a distance calculator apparatus for calculating distances between the position of the sound source and the positions of the microphones based on the calculated CSP coefficients and the distance information.

10. The system of claim 9, further comprising a remote control apparatus equipped with the sound source apparatus.

11. A computing device for calculating the position of a sound source using at least two microphones, the device comprising:
   a first sound generating apparatus section for generating a first sound (reproduced sound) emitted by the sound source;
   a detecting apparatus section for detecting the first sound from the sound source and a second sound (observed sound) at each of the microphones;
   a frequency spectrum transforming apparatus section for transforming signals of the first sound and the second sounds into frequency spectra;
   a CSP coefficient calculating apparatus section for calculating CSP coefficients of the transformed frequency spectra of the signals;
   a tracking apparatus section for tracking maximum values of the CSP coefficients using time as a variable;
   a transforming apparatus section for transforming the maximum values of he CSP coefficients into distance information; and
   a distance calculating apparatus section for calculating distances between the position of the sound source and the positions of the microphones based on the calculated CSP coefficients and the distance information.

12. The method according to claim 1, wherein the first sound is a sound reproduced by a speaker apparatus and wherein the second sound is a sound detected by the two microphones.

* * * * *